US010209799B2

(12) United States Patent
Xie et al.

(10) Patent No.: US 10,209,799 B2
(45) Date of Patent: Feb. 19, 2019

(54) TOUCH DISPLAY SYSTEM AND TOUCH OPERATION DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yu Xie, Beijing (CN); Yichiang Lai, Beijing (CN); Zhihan Zhou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/533,635

(22) PCT Filed: Dec. 30, 2016

(86) PCT No.: PCT/CN2016/113667
§ 371 (c)(1),
(2) Date: Jun. 6, 2017

(87) PCT Pub. No.: WO2017/118350
PCT Pub. Date: Jul. 13, 2017

(65) Prior Publication Data
US 2018/0052549 A1 Feb. 22, 2018

(30) Foreign Application Priority Data
Jan. 4, 2016 (CN) .......................... 2016 1 0003724

(51) Int. Cl.
G06F 3/0354 (2013.01)
G06F 3/041 (2006.01)
G06F 3/042 (2006.01)

(52) U.S. Cl.
CPC ............ *G06F 3/0412* (2013.01); *G06F 3/042* (2013.01); *G06F 3/0421* (2013.01); *G06F 3/03542* (2013.01)

(58) Field of Classification Search
CPC ...... G06F 3/0412; G06F 3/0421; G06F 3/042; G06F 3/03542
See application file for complete search history.

(56) References Cited

U.S. PATENT DOCUMENTS 4,320,292 A * 3/1982 Oikawa ................... G06F 3/042
250/221
6,184,863 B1 * 2/2001 Sibert ................... G06F 3/0325
345/156

(Continued)

FOREIGN PATENT DOCUMENTS

CN 102253737 A 11/2011
CN 103425351 A 12/2013

(Continued)

OTHER PUBLICATIONS

State Intellectual Property Office of the P.R.C (SIPO) Office Action 1 for 201610003724.0 dated Dec. 18, 2017 19 Pages (including translation).

(Continued)

*Primary Examiner* — Grant Sitta
(74) *Attorney, Agent, or Firm* — Anova Law Group, PLLC

(57) ABSTRACT

Touch display system and touch operation device are provided. An exemplary touch display system includes a touch operation device for emitting first non-visible light; and a touch display device including a touch screen and a touch detection module. The first non-visible light is able to heat up air around a contact point on the touch screen. The touch detection module is configured for determining a position of (Continued)

a light refraction occurred as a second non-visible light is incident on the air heated by the first non-visible light.

12 Claims, 2 Drawing Sheets

(56) References Cited

U.S. PATENT DOCUMENTS

| | | | |
|---|---|---|---|
| 6,239,789 B1* | 5/2001 | Sekizawa | G06F 3/038 345/173 |
| 8,384,682 B2* | 2/2013 | Hu | G06F 3/0386 345/173 |
| 8,553,014 B2* | 10/2013 | Holmgren | G06F 3/0421 345/173 |
| 2003/0107748 A1* | 6/2003 | Lee | G06F 3/0325 356/614 |
| 2004/0095312 A1* | 5/2004 | Chen | G02B 27/20 345/156 |
| 2006/0022958 A1* | 2/2006 | Shiga | G06F 3/016 345/173 |
| 2007/0176908 A1* | 8/2007 | Lipman | G06F 3/0386 345/179 |
| 2009/0040178 A1* | 2/2009 | Machida | G06F 3/0346 345/158 |
| 2009/0050806 A1* | 2/2009 | Schmidt | H04N 5/2254 250/332 |
| 2010/0092152 A1* | 4/2010 | Son | G06F 3/0386 386/241 |
| 2010/0171717 A1 | 7/2010 | Hu et al. | |
| 2011/0063206 A1* | 3/2011 | Karaoguz | G06F 3/0304 345/156 |
| 2012/0218390 A1* | 8/2012 | Wang | G06F 3/0304 348/51 |
| 2013/0185005 A1* | 7/2013 | Petrucelli | G01M 17/02 702/50 |
| 2014/0009443 A1* | 1/2014 | Hung | G06F 3/0425 345/175 |
| 2014/0176514 A1* | 6/2014 | Lin | G06F 3/0412 345/183 |
| 2014/0354597 A1* | 12/2014 | Kitchens, II | G06F 1/3215 345/175 |
| 2015/0049063 A1* | 2/2015 | Smith | G06F 3/0421 345/175 |
| 2015/0077763 A1* | 3/2015 | Maki | G06F 3/0428 356/614 |
| 2015/0177852 A1* | 6/2015 | Rankl | G06F 3/0304 250/214.1 |
| 2016/0139699 A1* | 5/2016 | Barel | G06F 3/042 345/174 |
| 2016/0231866 A1* | 8/2016 | Tretter | G06F 3/14 |
| 2016/0364039 A1* | 12/2016 | Yamada | G06F 3/041 |
| 2017/0212611 A1* | 7/2017 | Thomas | G06F 3/0386 |
| 2017/0228103 A1* | 8/2017 | Takahashi | G06F 3/0416 |

FOREIGN PATENT DOCUMENTS

| | | |
|---|---|---|
| CN | 104156130 A | 11/2014 |
| CN | 105607785 A | 5/2016 |
| CN | 2054151017 U | 8/2016 |

OTHER PUBLICATIONS

The World Intellectual Property Organization (WIPO) International Search Report for PCT/CN2016/113667 dated Mar. 22, 2017.

* cited by examiner

TOUCH DISPLAY SYSTEM AND TOUCH OPERATION DEVICE

CROSS-REFERENCES TO RELATED APPLICATIONS

This application is a national phase entry under 35 U.S.C. § 371 of International Application No. PCT/CN2016/113667, filed on Dec. 30, 2016, which claims priority to Chinese Patent Application No. 201610003724.0, filed on Jan. 4, 2016, the entire contents of both of which are incorporated by reference herein.

TECHNICAL FIELD

The disclosed subject matter generally relates to display technologies and, more particularly, relates to a touch display system, and a related touch operation device.

BACKGROUND

The existing infrared touch screen includes infrared transmitters and receivers, e.g., sensing units, that are mounted on the touch screen frame. An infrared detection network can be formed on the surface of the touch screen. An object that performs a touch operation, such as a finger, can change the infrared at the contacting point. As such, the coordinate position of the contacting point on the touch screen can be obtained. A touch operation to the touch screen can be realized.

However, in the conventional infrared touch technology, a touch operation to the touch screen can be realized by blocking the infrared signal at a contacting point. Clearly, this method only works when a user is sufficiently close to the device to perform a touch operation. A remote touch operation from a user cannot be achieved by using the existing infrared touch screen.

Accordingly, it is desirable to provide a touch display system, and a related touch operation device to at least partially alleviate one or more problems set forth above and to solve other problems in the art.

BRIEF SUMMARY

In accordance with some embodiments of the disclosed subject matter, a touch display system, and a related touch operation device are provided.

An aspect of the present disclosure provides a touch display system. The touch display system includes a touch operation device for emitting first non-visible light; and a touch display device including a touch screen and a touch detection module. The first non-visible light is able to heat up air around a contact point on the touch screen; and the touch detection module is configured for determining a position of a light refraction occurred as a second non-visible light is incident on the air heated by the first non-visible light.

Optionally, the touch detection module includes a first light transmitting unit on a first side of the touch screen for emitting the second non-visible light along a first direction; a first light receiving unit on a second side of the touch screen for receiving the second non-visible light emitted from the first light transmitting unit along the first direction; a second light transmitting unit on a third side of the touch screen for emitting the second non-visible light along a second direction; and a second light receiving unit on a fourth side of the touch screen for receiving the second non-visible light emitted from the second light transmitting unit along the second direction. The first side and the second side of the touch screen are opposite to each other, and the third side and the fourth side of the touch screen are opposite to each other.

Optionally, the first direction is intersected with the second direction, and the second non-visible light in both the first direction and the second direction form a detecting plane of the second non-visible light.

Optionally, the first light transmitting unit includes a first number of light transmitters; the first light receiving unit includes a number of light receivers that are respectively able to receive the second non-visible light emitted from the corresponding light transmitters along the first direction; the second light transmitting unit includes a second number of light transmitters; and the second light receiving unit includes a number of light receivers that are respectively able to receive the second non-visible light emitted from the corresponding light transmitters along the second direction.

Optionally, the first direction is substantially perpendicular to the second direction.

Optionally, the touch detection module further includes: a refraction detecting unit for determining whether the light refraction of the second non-visible light is occurred by detecting if one light receiver has received a second non-visible light having an intensity less than a threshold value; and a position obtaining unit for determining the position of the light refraction of the second non-visible light.

Optionally, the position obtaining unit is configured for: obtaining a first coordinate of the contact point by determining a coordinate of the one light receiver in the first direction that has received a second non-visible light having an intensity of less than the threshold value: and obtaining a second coordinate of the contact point by determining a coordinate of the one light receiver in the second direction that has received a second non-visible light having an intensity less than the threshold value.

Optionally, the touch operation device includes a heating light emitter for emitting the first non-visible light; and a positioning light emitter for emitting a positioning light in parallel with the first non-visible light emitted from the heating light emitter.

Optionally, the positioning light is a visible light.
Optionally, the positioning light is a visible laser.
Optionally, the first non-visible light is an infrared light.
Optionally, the second non-visible light is an infrared light.

Optionally, the touch operation device further includes a power supply for driving the heating light emitter and the positioning light emitter.

Another aspect of the present disclosure provides a touch operation device. The touch operation device includes a heating light emitter for emitting non-visible light capable of heating up air around a contact point on a touch display device; and a positioning light emitter for emitting a positioning light in parallel with the non-visible light emitted on the touch display device.

Optionally, the positioning light is a visible light.
Optionally, the positioning light is a visible laser.
Optionally, the non-visible light is an infrared light.
Optionally, a power supply is included for driving the heating light emitter and the positioning light emitter.

Optionally, the non-visible light and the positioning light are emitted along substantially a same direction.

Optionally, the positioning light emitter and the heating light emitter are configured, such that the non-visible light is emitted by following a direction of the positioning light to realize a touch operation on a position of the contact point on the touch display device.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

Figure 1:
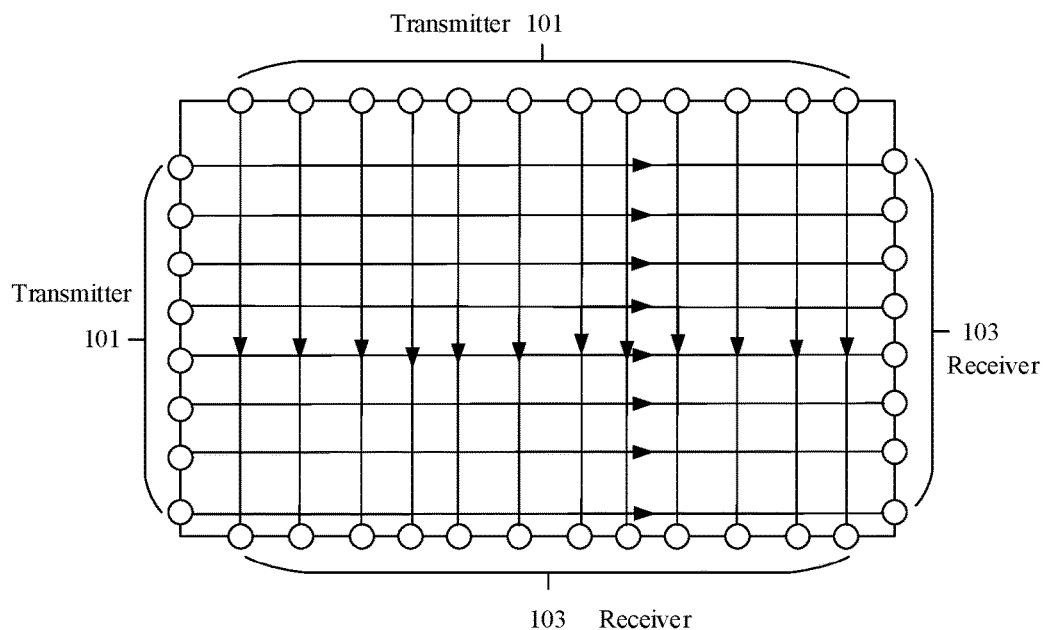
FIG. 1 is a schematic diagram of an existing touch operation detection device.

Referring to FIG. 1, a schematic diagram of an existing touch operation detection device is shown. As illustrated, multiple infrared transmitters and infrared receivers are on the circuit boards. The multiple infrared transmitters and infrared receivers are arranged on the four sides of an infrared touch screen. Thus, an infrared matrix close to the infrared touch screen can be formed in both X and Y directions. By constantly scanning whether the infrared signals are blocked by an object, a user's touch operation can be detected and located.

For example, a frame can be mounted in front of the infrared touch display. One or more circuit boards can be mounted in the frame to arrange multiple infrared transmitters and infrared receivers on the four sides of an infrared touch screen. Each of the infrared transmitters can correspond to one infrared receiver located on the other side of the infrared touch screen. Each infrared transmitter plus its corresponding infrared receiver can constitute an infrared tube. As such, an infrared matrix including multiple crossing infrared signals along the multiple infrared tubes can be formed in front of the infrared touch screen.

For each scanning lap, if all of the infrared tubes are unimpeded, a green light may be turned on to indicate that everything is normal. During the scanning of one coordinate, if one infrared signal is blocked, a red light may be turned on to indicate that a touch may occur. In the meantime, the scanning process can be switched to the other coordinate. If another infrared signal in the other coordinate is also blocked, a yellow light may be turned on to indicate that a touch is detected. The positions of the two infrared tubes where the infrared signals are blocked can be reported to a host. Based on that, the position of the contact point on the infrared touch screen can be calculated.

For the existing touch operation detection device, a specific object, such as a finger, a stylus, etc., must be placed on the infrared touch screen to block the infrared signals, so that a contact point can be detected by the infrared matrix to determine the position of the contact point. Thus, a user must be located close enough to the infrared touch screen to perform a touch operation. A remote touch operation from a user cannot be achieved by using the existing infrared touch screen.

In accordance with various embodiments, the disclosed subject matter provides a touch display system, and a related touch operation device.

In some embodiments, the disclosed touch display system can comprise a touch operation device for emitting first non-visible light, and a touch display device including a touch screen and a touch detection module. When the first non-visible light reaches a surface of the touch screen at a contact point, the first non-visible light is able to heat up air around the contact point.

In various embodiments, the air heated by first non-visible light around the contact point on the touch screen may be detected electrically or optically. In one example, a capacitor may be used herein to electrically detect the heated air around the contact point on the touch screen. In another example, light such as another non-visible light may be used to optically detect the heated air around the contact point on the touch screen.

In one embodiment, the touch detection module is configured for forming a detecting plane of second non-visible light, and for determining position of a light refraction of a second non-visible light incident on and then refracted in the air heated by the first non-visible light.

In some embodiments, the touch detection module can comprise a first light transmitting unit on a first side of the touch screen for emitting second non-visible light along a first direction, a first light receiving unit on a second side of the touch screen for receiving the second non-visible light emitted from the first light transmitting unit along the first direction, wherein the first side and the second side of the touch screen are opposite to each other, a second light transmitting unit on a third side of the touch screen for emitting second non-visible light along a second direction, and a second light receiving unit on a fourth side of the touch screen for receiving the second non-visible light emitted from the second light transmitting unit along the second direction, wherein the third side and the fourth side of the touch screen are opposite to each other. The first direction is intersected with the second direction, and the second non-visible light in both the first direction and the second direction form the detecting plane of the second non-visible light.

In some embodiments, the touch operation device can comprise a heating light emitter for emitting the first non-visible light, and a positioning light emitter for emitting a positioning light that is in parallel with the first non-visible light emitted from the heating light emitter. When the first non-visible light reaches a surface of a touch screen to form a contact point, the first non-visible light is able to heat up air around the contact point, and a distance between the positioning light and the first non-visible light is less than a distance.

Figure 2:
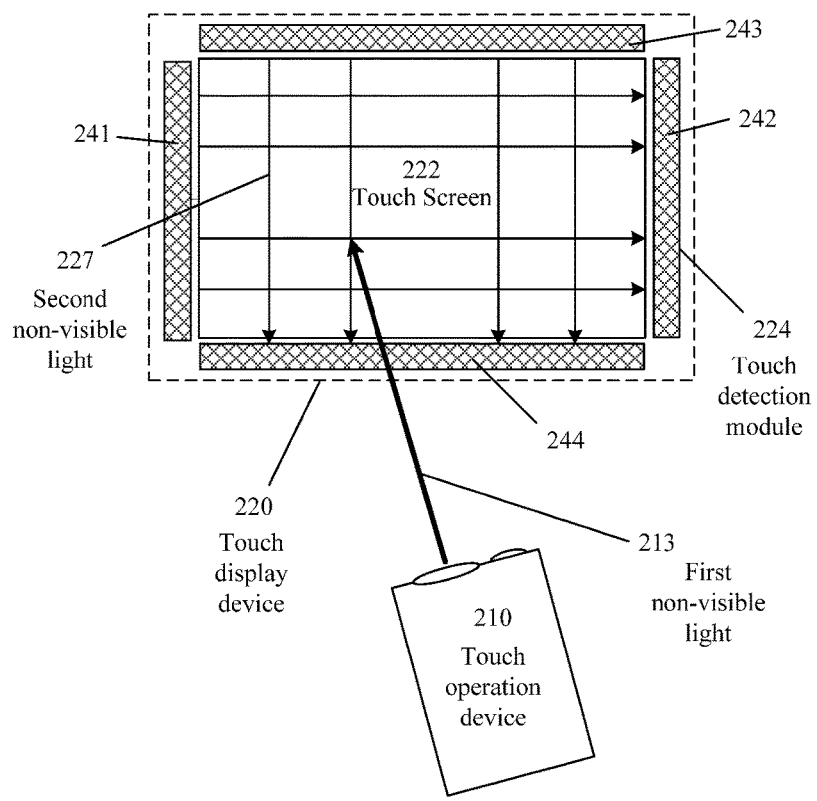
FIG. 2 is a schematic structural diagram of an exemplary touch display system in accordance with some embodiments of the disclosed subject matter.

Referring to FIG. 2, a schematic structural diagram of an exemplary touch display system is shown in accordance with some embodiments of the disclosed subject matter.

The touch display system can include a touch operation device 210 and a touch display device 220. The touch display device 220 can include a touch screen 222 and a touch detection module 224.

The touch operation device 210 can be used for transmitting a first non-visible light 213 to the touch display device 220. The first non-visible light 213 can reach the surface of the touch screen 222 to form a contact point, and can heat the air around the contact point.

The touch detection module 224 can be used to form a detecting plane on the surface of the touch screen 222 for second non-visible light 227. When a second non-visible light 227 passes through the air above the surface of the touch screen 222 that is heated by the first non-visible light 213, the second non-visible light 227 can be refracted. By determining a position of the refraction of the second non-visible light 227, the position of the contact point can be obtained.

In some embodiments, the touch operation device 210 can emit a first non-visible light 213, and can position the first non-visible light 213 at a certain location of touch screen 222. The air around the certain location of touch screen 222 can be heated up by the first non-visible light 213, thereby becomes thinner air.

In some embodiments, both the first non-visible light 213 and the second non-visible light 227 are infrared light.

When the second non-visible light 227 emitted from the touch detection module 224 passes through the thinner air at the certain location of touch screen 222, the second non-visible light 227 can be refracted from its original light path. Thus, when a detected light path does not match a predetermined light path, the position of the light refraction can be determined as the location of the air that has been heated by the first non-visible light 213, which is the position of the touch operation performed by a user.

In some embodiments, the touch detection module 224 can have the following structure. A first light transmitting unit 241 can be disposed on a first side of the touch screen 222 for emitting second non-visible light 227 along the X direction. A first light receiving unit 242 can be disposed on a second side of the touch screen 222 for receiving the second non-visible light 227 emitted from the first light transmitting unit 241 along the X direction. The first side and the second side of the touch screen 222 are opposite to each other.

A second light transmitting unit 243 can be disposed on a third side of the touch screen 222 for emitting second non-visible light 227 along the Y direction. A second light receiving unit 244 can be disposed on a fourth side of the touch screen 222 for receiving the second non-visible light 227 emitted from the second light transmitting unit 243 along the Y direction. The third side and the fourth side of the touch screen 222 are opposite to each other.

The second non-visible light 227 in the X direction and the Y direction can form a second non-visible light field detection surface.

Because the X direction and the Y direction are intersected with each other, a two-dimensional coordinate system can be formed. If two second non-visible light 227 emitted from the two directions refract at a certain location, the position of the refraction location can be determined through the two-dimensional coordinate system. In one embodiment, in order to simplify the calculation of the position, the X direction may be substantially perpendicular to the Y direction.

In the above described embodiments, the touch screen 222 has four sides, as a common rectangular screen. It should be noted that, the touch screen 222 having four sides is only used as an example. In some other embodiments, any touch screen 222 having any suitable shape can be used. For example, a polygonal-shaped touch display, a circular touch display, or a near-circular touch display, etc., can include light transmitting units and light receiving units disposed along the X direction and the Y direction to transmit and receive the second non-visible light to realize the touch operation detection.

Figure 3:
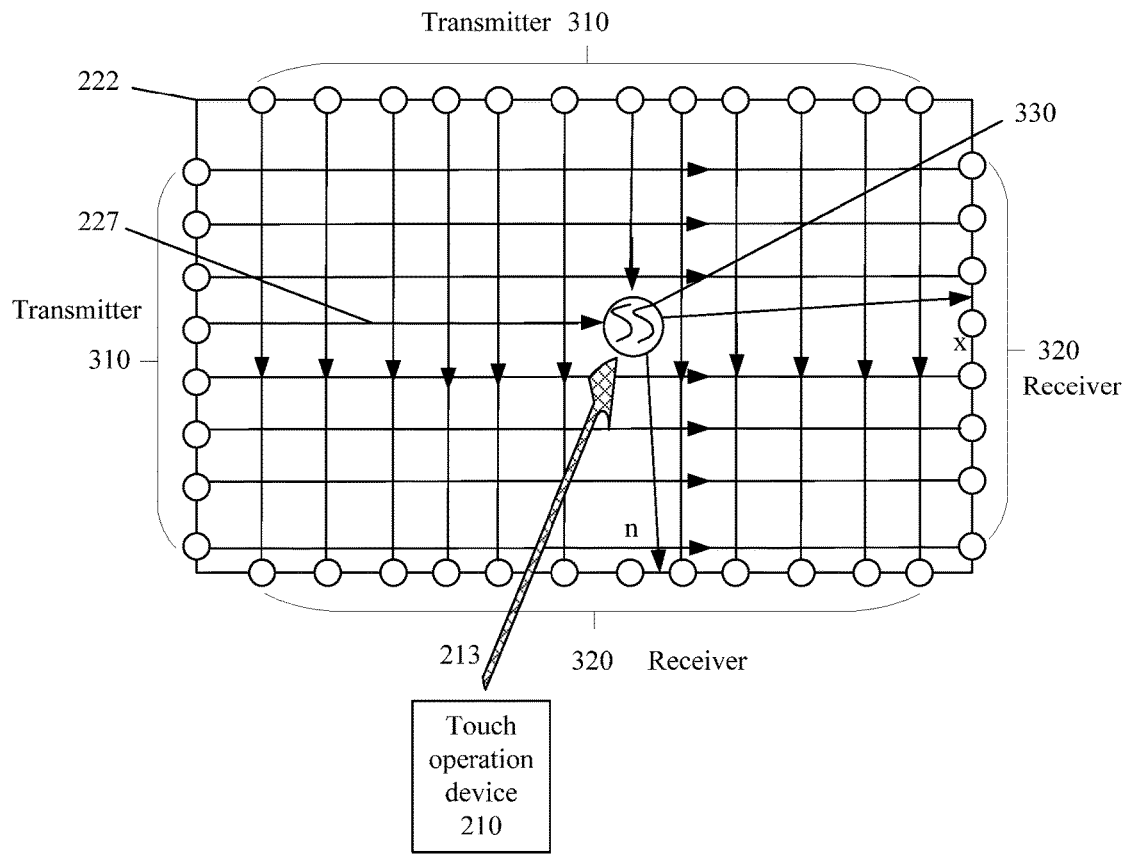
FIG. 3 is a schematic diagram of a touch operation performed on an exemplary touch display system in accordance with some embodiments of the disclosed subject matter.

Referring to FIG. 3, a schematic diagram of a touch operation performed on an exemplary touch display system is shown in accordance with some embodiments of the disclosed subject matter.

As illustrated, a rectangular touch screen is used as an example. The first light transmitting unit 241 can include multiple light transmitters 310 for emitting the second non-visible light 227 in the X direction. The second light receiving unit 242 can include multiple light receivers 320 for receiving the second non-visible light 227 in the X direction.

A number of the light transmitters 310 in the first light transmitting unit 241 can be equal to a number of the light receivers 320 in the second light receiving unit 242, which can be set as a first number. Therefore, each light receiver 320 can receive a second non-visible light 227 emitted from a corresponding light transmitter 310 along the X direction. In some cases, the number of the light transmitters 310 in the first light transmitting unit 241 can be less or greater than the number of the light receivers 320 in the second light receiving unit 242, according to various embodiments of the present disclosure.

The third light transmitting unit 243 can include multiple light transmitters 310 for emitting the second non-visible light 227 in the Y direction. The fourth light receiving unit 244 can include multiple light receivers 320 for receiving the second non-visible light 227 in the Y direction.

A number of the light transmitters 310 in the third light transmitting unit 243 can be equal to a number of the light receivers 320 in the fourth light receiving unit 244, which can be set as a second number. Therefore, each light receiver 320 can receive a second non-visible light 227 emitted from a corresponding light transmitter 310 along the Y direction. In some cases, the number of the light transmitters 310 in the third light transmitting unit 243 can be less or greater than the number of the light receivers 320 in the fourth light receiving unit 244, according to various embodiments of the present disclosure.

In some embodiments, the first number and the second number can be determined based on the actual needs of the detection accuracy. In some embodiments, the X direction is perpendicular to the Y direction.

In some embodiments, the touch detection module 224 can further include a refraction detecting unit for detecting if one light receiver 320 has received a second non-visible light having an intensity less than a threshold value. In various embodiments, such threshold value may be determined and set according to specific applications. When the detecting result is positive, an occurrence of a refraction of the second non-visible light can be determined.

The touch detection module 224 can further include a position obtaining unit for determining the position of the refraction of the second non-visible light. For example, the position obtaining unit can determine the Y coordinate of the contact point by determining the coordinate of the one light receiver 320 in Y direction that has received a second non-visible light having an intensity less than a threshold value. The position obtaining unit can also determine the X coordinate of the contact point by determining the coordinate of the one light receiver 320 in X direction that has received a second non-visible light having an intensity less than a threshold value.

In some embodiments, the touch detection module 224 can further optionally include a touch information generating unit for generating touch information based on the X coordinate and Y coordinate of the contact point determined by the position obtaining unit.

In some embodiments, the touch detection module 224 can further optionally include a touch information transmission unit for sending the touch information generated by the touch information generating unit to a display apparatus on one side of the touch screen 222. The display apparatus can process the touch information and instruct the touch screen 222 to perform a specific operation based on the processed touch information.

The intensity of the second non-visible light received from a corresponding light receiver 320 is related to the refraction degree of the second non-visible light. If the refraction degree is very large, the intensity of the second non-visible light received from the corresponding light receiver 320 may be very small or be zero. As long as the intensity of the second non-visible light received from the corresponding light receiver 320 is less than a threshold value, an occurrence of a refraction of the second non-visible light can be determined.

Figure 4:
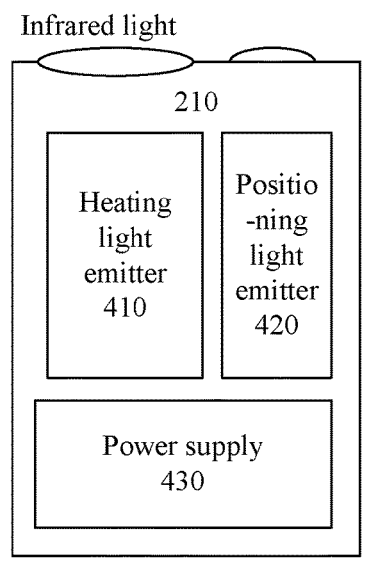
FIG. 4 is a schematic structural diagram of an exemplary touch operation device in accordance with some other embodiments of the disclosed subject matter.

Referring to FIG. 4, a schematic structural diagram of a touch operation device is shown in accordance with some embodiments of the disclosed subject matter. As illustrated, the touch operation device 210 can include a heating light emitter 410, a positioning light emitter 420, and a power supply 430.

The heating light emitter 410 can be used for emitting a first non-visible light, e.g., first non-visible light 213, to the surface of the touch screen 222 to form a contact point, and can heat the air near the surface of the touch screen 222 around the contact point. The heated air can refract the second non-visible light incident on the heated air.

In some embodiments, the first non-visible light and the second non-visible light can be infrared light. By choosing the second non-visible light as an infrared light, the infrared touch detection devices of the existing infrared touch screen can be used without redesigning, thereby saving the design costs. Furthermore, infrared light has a good heating effect. Thus, by choosing the first non-visible light as an infrared light, the air around the contact point on the surface of the touch screen can be heated up enough in a very short period of time to refract the second non-visible light.

The positioning light emitter 420 can be used for emitting a positioning light that is in parallel with and close to the first non-visible light emitted from the heating light emitter 410. Theoretically, a distance between the positioning light and the first non-visible light can be as small as possible. Practically, a distance between the positioning light and the first non-visible light can be less than a preset distance that satisfies the touch operation accuracy requirements. In a specific embodiment, the distance between the positioning light and the first non-visible light can be zero.

The positioning light can be a visible light. Since the position light is in parallel with and is transmitted in a same direction of the first non-visible light, a user can simply follow the direction of the positioning light to control the position of the contact point of the first non-visible light to realize a touch operation.

In some embodiments, the positioning light can be a visible laser light. Since the visible laser light has strong directivity, little divergence, high brightness, it is suitable to be used as a positioning light to provide highly accurate positioning.

In one embodiment, as illustrated in FIG. 4, the heating light emitter 410 can be an infrared emission device, and the positioning light emitter 420 can be a laser pointer. Besides, a power supply 430 can be used for driving the heating light emitter 410 and positioning light emitter 420. In some other embodiments, any other suitable method, such as using a plug-in interface, can be used to provide power to the touch operation device 210.

As a specific example, referring back to FIG. 3, when the touch operation device 210 emits an infrared light 213 towards a target position 330 on the surface of the touch screen 222. The infrared light 213 can heat up the air around the target position 330. Thus the air density near the contact point 330 can be reduced. When an invisible light emitted from the light transmitter 310 goes through the air around the target position 330, the invisible light can be refracted. Thus, the corresponding light receiver 320 may receive an invisible light having an intensity less than a threshold value, or may not receive the invisible light. Further, based on the positions of the x-th light receiver 320 and the n-th light receiver 320, the coordinates of the light refraction can be determined. Therefore, a remote touch operation on the target position 330 can be realized.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a touch display system, and a related touch operation device are provided. In some embodiments, the disclosed touch operation device can emit a non-visible light to heat up a contact point on the touch screen of a display. The rising temperature of the region around the contact point can reduce the air density. A non-visible light can then be refracted. By determining the position of the light refraction, the coordinates of the contact point on the display can be obtained.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A touch display system, comprising:
   a touch operation device for emitting first non-visible light; and
   a touch display device, independent of the touch operation device, including:

a touch screen, the first non-visible light reaching a surface of the touch screen to form a contact point and heating up air around the contact point to cause a light refraction; and first light transmitters, first light receivers, second light transmitters, and second light receivers, configured to determine a position of the contact point, wherein:
the first light transmitters and the first light receivers are arranged on a first side and a second side of the touch screen respectively, along a first direction, and the first light transmitters correspond to the first light receivers, the second light transmitters and the second light receivers are arranged on a third side and a fourth side of the touch screen respectively, along a second direction, and the second light transmitters correspond to the second light receivers, the position of the contact point includes a first position where second non-visible light emitted from one of the first light transmitters is refracted by the heated air, and the first position is determined by a position of one of the first light receivers, along the first direction, that receives the second non-visible light with an intensity less than a first threshold, and the position of the contact point includes a second position where third non-visible light emitted from one of the second light transmitters is refracted by the heated air, and the second position is determined by a position of one of the second light receivers, along the second direction, that receives the third non-visible light with an intensity less than a second threshold.

2. The touch display system of claim 1, wherein:
the first side and the second side of the touch screen are opposite to each other; and
the third side and the fourth side of the touch screen are opposite to each other.

3. The touch display system of claim 2, wherein:
the first direction is intersected with the second direction, and
non-visible light emitted from the first light transmitters and non-visible light emitted from the second light transmitters form a detecting plane for determining a position of the contact point.

4. The touch display system of claim 3, wherein:
a first number of the first light receivers respectively is configured to receive the non-visible light emitted from the corresponding first light transmitters along the first direction, and the first light transmitters include the first number of light transmitters; and a second number of the second light receivers respectively is configured to receive the non-visible light emitted from the corresponding second light transmitters along the second direction, and the second light transmitters include the second number of light transmitters.

5. The touch display system of claim 4, wherein the first direction is substantially perpendicular to the second direction.

6. The touch display system of claim 1, wherein the touch operation device comprises:
a heating light emitter for emitting the first non-visible light; and
a positioning light emitter for emitting a positioning light in parallel with the first non-visible light emitted from the heating light emitter.

7. The touch display system of claim 6, wherein the positioning light is visible light.

8. The touch display system of claim 7, wherein the positioning light is visible laser.

9. The touch display system of claim 6, wherein the first non-visible light is infrared light.

10. The touch display system of claim 1, wherein the second non-visible light and the third non-visible light are infrared light.

11. The touch display system of claim 6, wherein the touch operation device further comprises:
a power supply for driving the heating light emitter and the positioning light emitter.

12. The touch display system of claim 6, wherein:
the positioning light emitter and the heating light emitter of the touch operation device are configured for emitting the first non-visible light to follow a direction of the positioning light to realize a touch operation on a position of the contact point on the touch display device.

* * * * *